United States Patent [19]

Shaw et al.

[11] Patent Number: 4,736,568

[45] Date of Patent: Apr. 12, 1988

[54] MACHINE FOR SEALING CUPS

[75] Inventors: Archie W. Shaw, Orfordville; Stephen P. Johnson, Janesville, both of Wis.

[73] Assignee: Rutherford Research, Inc., Roscoe, Ill.

[21] Appl. No.: 913,097

[22] Filed: Sep. 29, 1986

[51] Int. Cl.⁴ ............................................. B65B 7/28
[52] U.S. Cl. ......................................... 53/297; 53/290
[58] Field of Search ................ 53/478, 297, 296, 290; 493/108, 109, 102

[56] References Cited

U.S. PATENT DOCUMENTS

| | | | |
|---|---|---|---|
| 1,652,595 | 12/1927 | Weeks et al. | 53/297 X |
| 1,780,639 | 11/1930 | Burdick et al. | 53/297 X |
| 2,025,812 | 12/1935 | Enock | 53/297 |
| 2,061,577 | 11/1936 | Huyett | 53/297 X |
| 2,190,509 | 2/1940 | Baum | 53/297 X |
| 4,362,002 | 12/1982 | Rowland et al. | 53/297 X |

*Primary Examiner*—James F. Coan
*Attorney, Agent, or Firm*—Leydig, Voit & Mayer, Ltd.

[57] ABSTRACT

A web of heat-sealable material is advanced in overlying relation with a row of filled cups to a sealing station where both the web and a cup dwell momentarily. During the dwell period, a head at the sealing station advances downwardly and successively tamps a disc-like portion of the web downwardly into the upper end portion of the cup, seals the disc-like portion to and around the upper lip of the cup and then severs the disc-like portion from the web so as to leave the cup sealed with a flexible membrane.

4 Claims, 3 Drawing Sheets

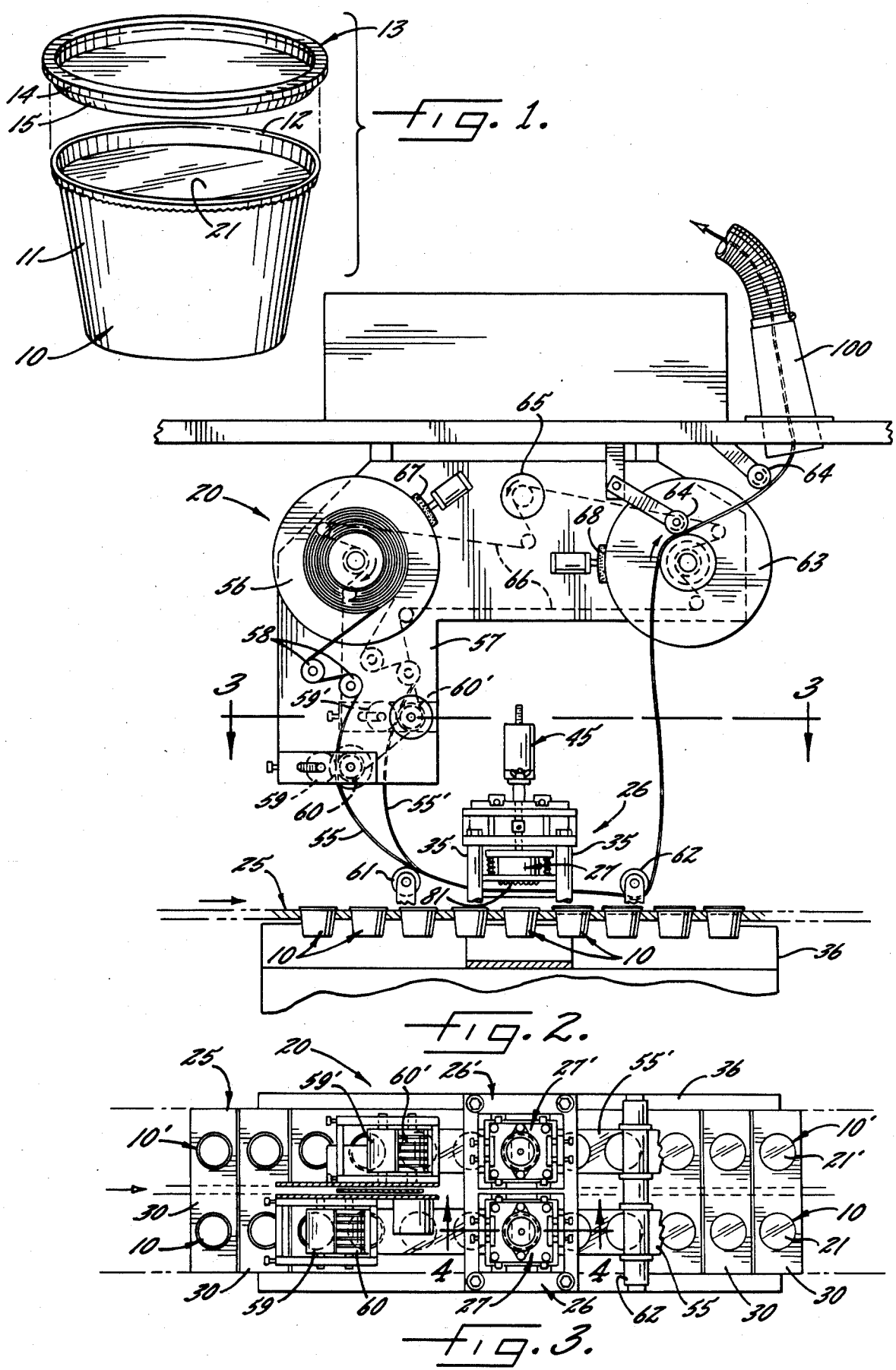

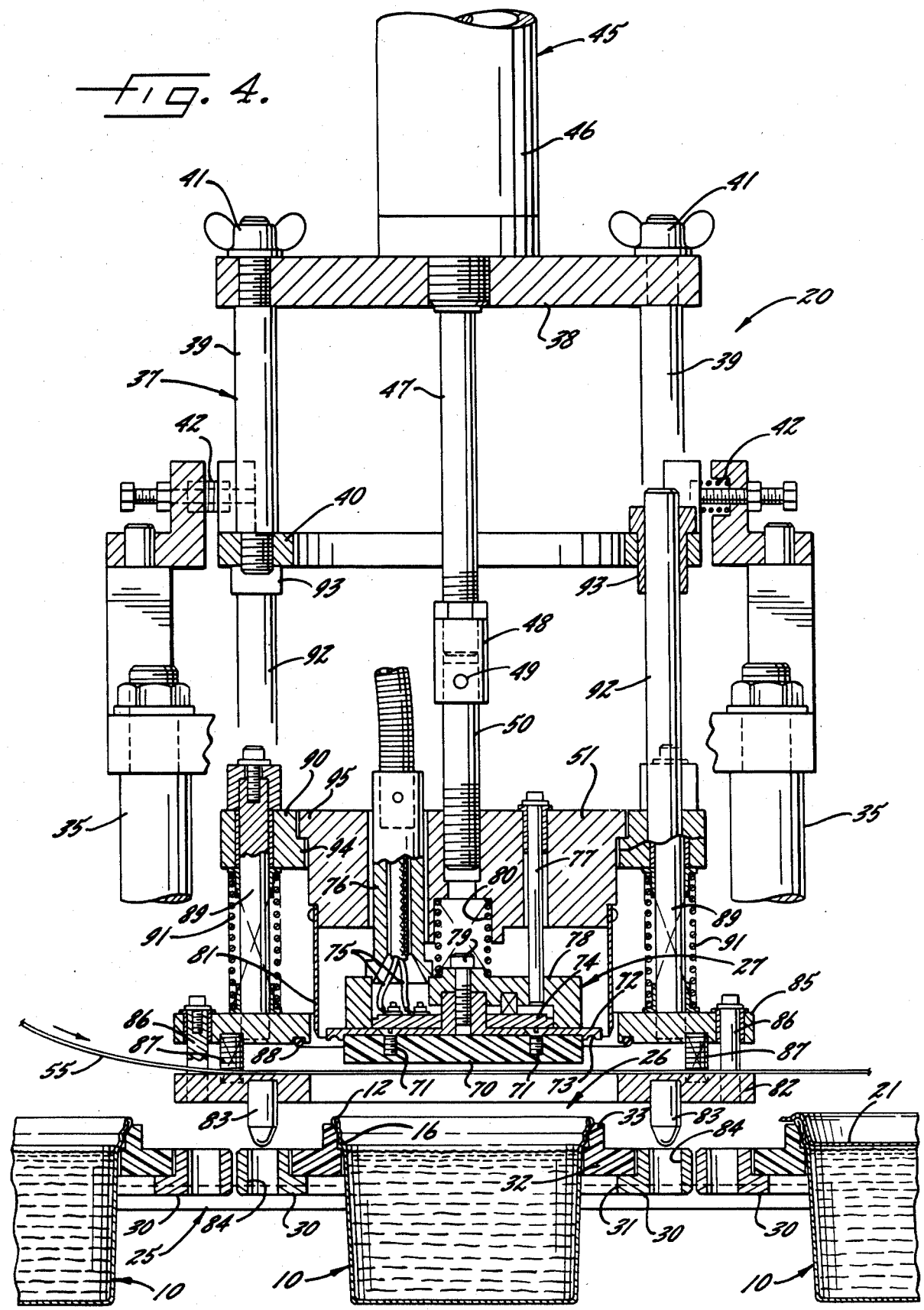

4,736,568

MACHINE FOR SEALING CUPS

BACKGROUND OF THE INVENTION

This invention relates to a method and machine for sealing the upper ends of cups filled with product such as a food product. The cups may, for example, be of the type used to hold cottage cheese, sour cream, snack dips or the like.

A typical cup is vacuum-formed from styrene and includes an outwardly turned peripheral bead or lip around its upper end. A plastic lid is adapted to snap over the lip and releasably close the cup, a portion of the lid usually projecting downwardly a short distance into the upper end of the cup and telescoping with the inner wall thereof to help close the cup.

SUMMARY OF THE INVENTION

The general aim of the present invention is to provide a new and improved method and machine for applying a sealing film to the top of a filled cup of the above type, the machine being particularly characterized by its ability to tamp the central portion of the film downwardly into the cup so as to enable the film to accommodate the lid while effectively sealing the peripheral edge portions of the film to the cup around the lip thereof in order to establish both a freshness seal and a tamper-evident seal.

A more detailed object of the invention is to provide a machine in which film is placed over a cup and is tamped downwardly into the cup to form a film disc which is sealed around its peripheral edge to the lip of the cup and then is cut out of a traveling web of film, all of the operations occurring in rapid succession at a single station.

Still another object of the invention is to effectively seal film to a cup in the manner described above while avoiding any substantial wrinkling of the film and any damage to the cup.

The invention also resides in the unique and relative compact construction of a cup fixturing element, a film tamping element, a film stretching element, a film sealing element and a film cutting element within a single head and in the relative ease with which different types of heads may be quickly interchanged to enable the same basic machine to be changed over to handle cups of various sizes and shapes.

These and other objects and advantages of the invention will become more apparent from the following detailed description when taken in conjunction with the accompanying drawings.

BRIEF DESCRIPTION OF THE DRAWINGS

FIG. 1 is a perspective view showing a typical cup adapted to be sealed by the new and improved method and machine incorporating the unique principles of the present invention, the lid of the cup being shown in exploded relation with the cup.

FIG. 2 is a somewhat schematic side elevational view of the machine.

FIG. 3 is a fragmentary cross-section taken substantially along the line 3—3 of FIG. 2.

FIG. 4 is an enlarged fragmentary cross-section taken substantially along the line 4—4 of FIG. 3 and shows the head of the machine retracted to an upper inactive position.

DETAILED DESCRIPTION OF THE PREFERRED EMBODIMENT

Figure 5:
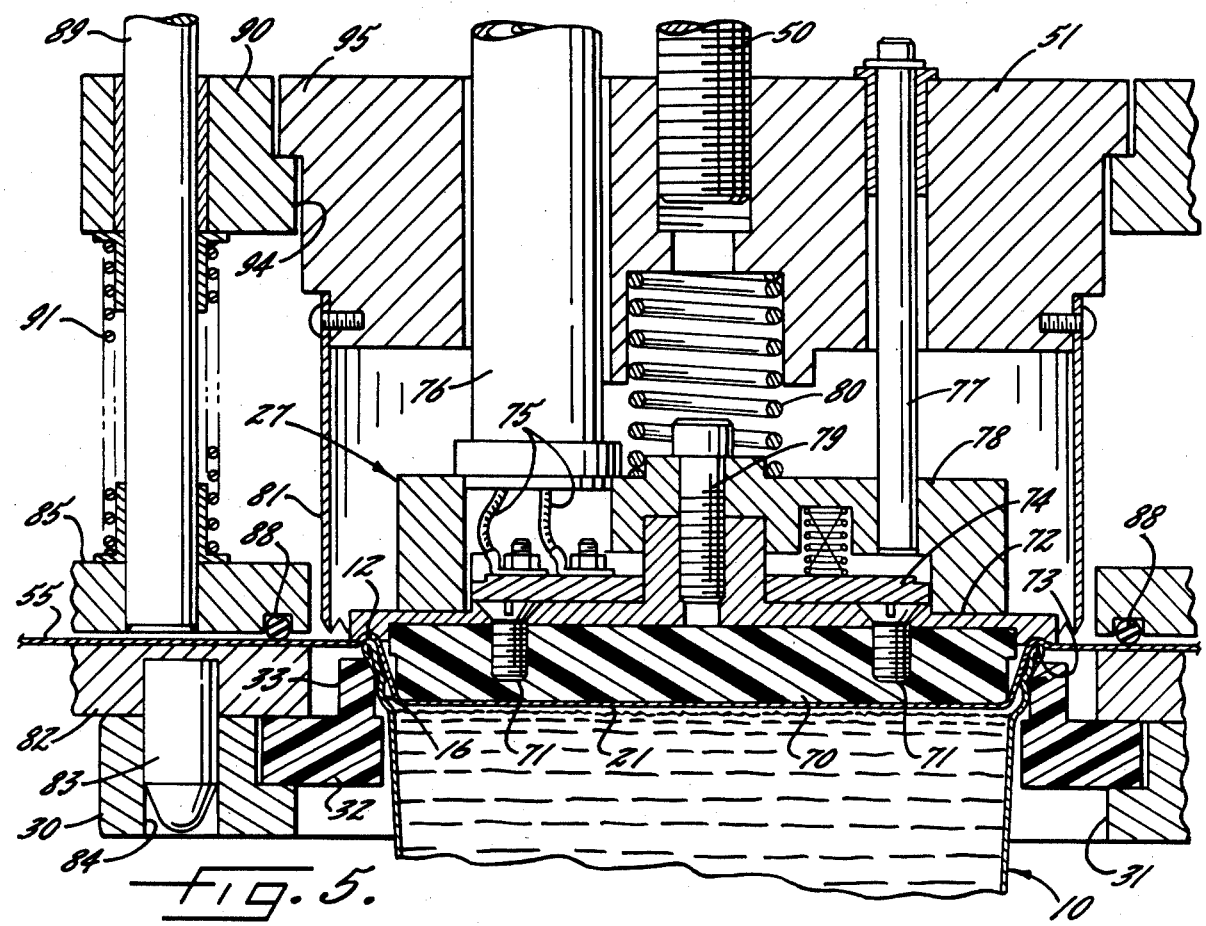
FIG. 5 is a view similar to FIG. 4 but shows the head advanced downwardly toward an active position to seal the film to the cup.

For purposes of illustration, the machine of the present invention is shown in the drawings in conjunction with a cup 10 of the type which is used to hold cottage cheese or the like. The cup is vacuum-formed from styrene or other plastic-like material and includes a gradually tapered body 11 of circular cross-section. Formed around the extreme upper end of the body is a lip 12 (FIG. 4) which curves outwardly and then extends downwardly a short distance along the outer side of the body. The lip coacts with a cover or lid 13 having a peripheral skirt 14 and a depending plug portion 15. When the lid is applied to the cup, the skirt 14 snaps releasably around the lip 12 while the plug portion 15 telescopes downwardly a short distance into the cup and engages the inner wall of the body 11. An outwardly projecting annular rib 16 (FIG. 4) is formed in the body of the cup just below the lip 12 for the purpose of enabling empty cups to be stacked with one another prior to filling.

The present invention contemplates the provision of a new and improved machine 20 for tamping a sealing membrane 21 downwardly into the upper end portion of each filled cup 10 and for sealing the membrane effectively to the cup around the lip 12 thereof after the cup has been filled with product and before the lid 13 is applied to the cup. By virtue of being tamped to a depressed position within the cup, the sealing membrane 21 accommodates the plug portion 15 of the lid or overcap 13 and yet, at the same time, seals in freshness and provides the consumer with a tamper-evident means to enable the consumer to determine whether the cup has been opened prior to purchase.

More specifically, the machine 20 includes a power-driven endless conveyor 25 adapted to advance two laterally spaced rows of filled cups 10 and 10' step-by-step along a predetermined path through a pair of laterally spaced sealing stations 26 and 26'. The machine includes a pair of laterally spaced heads 27 and 27' in the sealing stations 26 and 26', respectively, and, since the two heads are identical, only the front head 27 in the front sealing station 26' will be described in detail.

As shown most clearly in FIGS. 3 and 4, the conveyor 25 includes a series of rigid plates 30 spaced along the path of advance of the cups 10 and flexibly connected to one another to enable the conveyor to be trained around end sheaves (not shown). Each plate is formed with a counterbore 31 (FIG. 4) which receives both the lower portion of the cup body 11 and an adaptor ring 32. The latter is made of rigid plastic, closely encircles the cup body 11 and is formed with an upstanding annular flange 33 which engages the lip 12 of the cup. By replacing the adaptor rings 33 with rings having a different inner diameter and/or shape, the conveyor 25 may be easily changed over to handle cups of a different size or shape.

The head 27 in the sealing station 26 is supported by rigid posts 35 (FIG. 4) which project upwardly from the main frame 36 (FIG. 2) of the machine 10. A subframe 37 (FIG. 4) is supported at the upper end portions of the posts and includes an upper plate 38, rods 39 with threaded ends, and a lower ring 40. The lower ends of the rods 39 are screwed into the ring 40 while the upper ends of the rods are attached to the upper plate 38 by wing nuts 41. Spring-loaded fastener assemblies 42 connect the upper end portions of the posts 35 to the subframe 37 and enable the subframe to be selectively adjusted along the path of the cups 10 and into alinement with a cup dwelling in the sealing station 26.

Supported on the upper side of the plate 38 is a reciprocating fluid-operated actuator 45 having a cylinder 46 and having a rod 47 adapted to be advanced downwardly when opposite ends of the cylinder are alternately pressurized. A sleeve 48 is carried on the lower end portion of the cylinder rod 47 and is detachably coupled by set screws 49 to a lower rod 50 having a lower end portion threaded into a block 51 which forms part of the head 27.

In carrying out the invention, an elongated web 55 of heat-sealable film is advanced step-by-step beneath the head 27 and through the sealing station 26 in overlying relation with the filled cups 10. The web dwells each time a cup dwells in the station. During each dwell period, the head 27 is advanced downwardly by the actuator 45 so as to push a disc-like portion of the web downwardly into the upper end portion of the cup, to seal the peripheral portion of the web to the cup around the lip 12 thereof and then to cut the disc-like portion away from the web and thereby leave the sealing membrane 21 at the top of the cup. The web preferably is made of thin metallic foil laminated with a layer of heat sealable material.

In order to feed the web 55, an elongated strip of web is wound around a power-driven supply roll 56 (FIG. 2) which is rotatably supported by a frame member 57. After leaving the supply roll 56, the web loops around a pair of idler rolls 58 and is threaded through a pair of pinch rolls 59 and 60. Thereafter, the web passes above an idler roll 61, beneath the head 27, under an idler roll 62 and then across a power-driven take-up roll 63, the web being guided past the latter roll by a pair of rollers 64.

A motor 65 (FIG. 2) with a clutch (not visible) is supported on the frame member 57 and drives an endless chain 66 which is operable to rotate the supply roll 56, the pinch roll 60 and the take-up roll 63. When the clutch of the motor is engaged, the rolls 56, 60 and 63 cause the web 55 to advance downwardly to the sealing station 26, horizontally through the station and then upwardly out of the station. When the clutch is disengaged, brakes 67 and 68 are simultaneously enagaged and stop the rolls 56 and 63, respectively. When the rolls 56 and 63 are stopped, the web 55 dwells in a relatively slack state in the sealing station 26. An arrangement similar to the arrangement for advancing the web 55 is used to advance a web 55' through the sealing station 26'.

To tamp the web 55 downwardly into the dwelling cup 10, the head 27 includes a lower circular mandrel 70 (FIG. 4) made of firm rubber and a diameter just slightly smaller than the inner diameter of the upper end portion of the cup. Overlying the mandrel and secured thereto by screws 71 is a sealing shoe 72 whose lower side is formed with a downwardly opening groove 73 extending around the peripheral portion of the shoe. The groove is generally complementary in shape to the shape of the lip 12 of the cup 10 and is adapted to receive the lip when the head 27 is advanced downwardly.

Secured rigidly to the upper side of the sealing shoe 72 is an electric heating element 74 which is adapted to heat the shoe when energized by voltage applied to conductors 75. The conductors are housed within a sleeve 76 which extends slidably through the block 51 of the head 27. Rods 77 (only one of which is visible) also extend slidably through the block 51 and are connected securely to a collar 78 which, in turn, is connected to the sealing shoe 72 by a screw 79. A coil spring 80 is compressed between the lower side of the block 51 and the upper side of the collar 78 and urges the mandrel 70 and the sealing shoe 72 downwardly away from the block.

Cutting of the web 55 is effected by an annular cutter or knife 81 of circular cross-section. The knife is attached rigidly to the lower end portion of the block 51 and, when the head 27 is retracted upwardly as shown in FIG. 4, the annular cutting edge of the knife is located just above the lower active surface of the sealing shoe 72.

The head 27 is completed by means for fixturing the head rigidly and accurately relative to each cup 10 dwelling in the sealing station 26 and by means for holding the web 55 taut during sealing and cutting of the web. Herein, the fixturing means comprise an annular platen 82 located below the web 55 and normally spaced above the conveyor 25. The platen 82 carries a plurality of downwardly projecting locating dowels 83 which are sized to telescope into holes 84 formed in the plates 30 of the conveyor 25. When the head 27 is advanced downwardly, the dowels 83 interfit closely with the holes 84 to prevent the head from shifting both laterally and longitudinally relative to the cup 10 carried by the plate 30.

The platen 82 is connected to an overlying annular plate 85 by a series of vertical pins 86 which extend slidably through the plate 85, the pins being located outwardly of the edges of the web 55. Coil springs 87 are compressed between the platen 82 and the plate 85 and urge the platen downwardly relative to the plate.

Near its inner periphery, the lower side of the plate 85 carries a resiliently yieldable O-ring 88. As the head 27 is advanced downwardly, the plate 85 moves downwardly relative to the platen 82 as permitted by the pins 86 and the springs 77 and, as an incident thereto, the O-ring 88 compresses and presses the web 55 against the platen 82 to hold the web taut and help prevent wrinkling of the web during sealing and cutting.

The plate 85 is carried on the lower ends of a series of rods 89 which extend slidably through an overlying ring 90, there being coil springs 91 telescoped over the rods 89 and compressed between the plate 85 and the ring 90 to urge the plate downwardly relative to the ring. Additional rods 92 are fixed to the ring 90 and extend slidably through bushings 93 in the ring 40 of the subframe 37. The ring 90 is formed with an inwardly projecting annular flange 94 which is secured rigidly by fasteners (not visible) to an outwardly projecting annular flange 95 on the block 51.

To help gain an understanding of the operation of the machine 20, assume that a filled cup 10 is dwelling in the sealing station 26, that the web 55 is dwelling above the cup in a somewhat slack condition and that the head 27 is retracted upwardly as shown in FIG. 4. As soon as the cup dwells, the cylinder 46 of the actuator 45 is pressurized to advance the rod 47 downwardly. The rod 47 acts through the rod 50 and the block 51 to shift the mandrel 70, the sealing shoe 72 and the knife 81 downwardly. At the same time, the flange 95 on the block 51 acts through the flange 94 on the ring 90 to shift the ring downwardly as permitted by the slidable rods 92. During downward movement of the ring 90, the springs 91 and 87 act as rigid links and thus cause the plate 85 and the platen 82 to move downwardly in unison with the ring.

After the platen 82 has moved downwardly a certain distance, the dowels 83 telescope into the holes 84 in the underlying plate 30 of the conveyor 25 and thereby fixture the head 27 rigidly both longitudinally and laterally of the conveyor (see FIG. 5). Just shortly thereafter, the platen 82 is stopped by the plate 30 of the conveyor but the overlying plate 85 and the block 51 continue to move downwardly as permitted by the pins 86 and the springs 87. Accordingly, the mandrel 70 engages the web 55 above the cup 10 and then telescopes downwardly a short distance into the cup so as to take the slack out of the web and to tamp a disc-like portion of the web downwardly into the upper end portion of the cup in close engagement with the inner side of the cup body 11 (see FIG. 5).

As the mandrel 70 moves downwardly into the cup body 11, the plate 85 moves toward the web 55 and causes the O-ring 88 to engage the upper side of the web and clamp the web against the platen 82 as shown in FIG. 5. Immediately thereafter, the sealing shoe 72 engages the web, the groove 73 in the shoe telescoping over the lip 12 of the cup 10 so as to seal the web to the inner, top and outer sides of the lip around the entire periphery of the lip. Since the web is clamped between the platen 82 and the O-ring 88 during sealing, the web is stretched rather tightly so as to make the center portion of the membrane 21 substantially wrinkle-free as the seal is formed. Downward movement of the sealing shoe relative to the plate 85 is permitted by virtue of the rods 89 and the springs 91.

Figure 6:
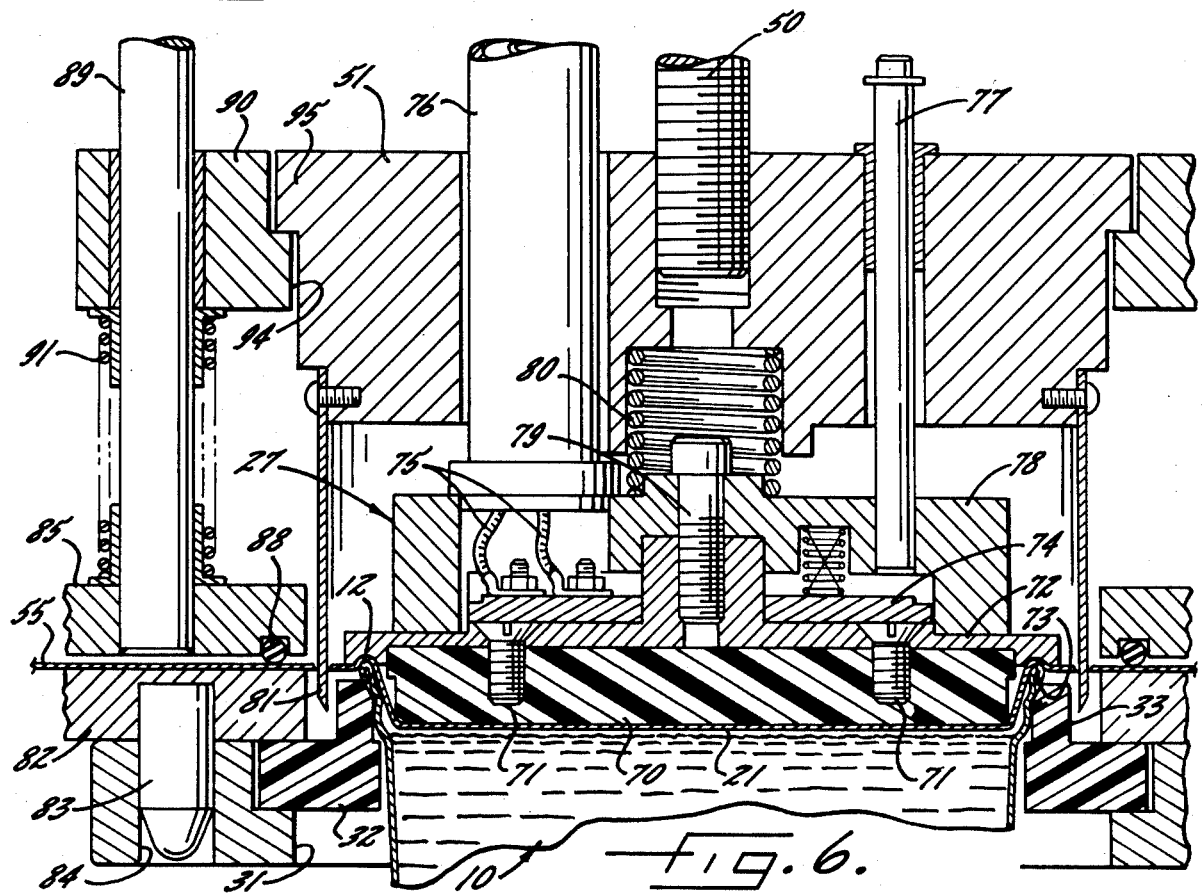
FIG. 6 is also a view similar to FIG. 4 but shows the head in a still further advanced position to cut film from the web.

When the closed end of the groove 73 engages the top of the cup lip 12, further downward movement of the mandrel 70 and the sealing shoe 72 is stopped. At this time, the spring 80 yields and, as a result of this together with further yielding of the springs 91, the block 51 is permitted to move downwardly relative to the stopped mandrel 70 and sealing shoe 72. Accordingly, the knife 81 is shifted downwardly as shown in FIG. 6 to cause its cutting edge to move downwardly through the web 55 and thereby sever the circular membrane 21 from the web.

After the web 55 has been cut, the cylinder 46 is pressurized to retract the head 27 upwardly to the position shown in FIG. 4. The conveyor 25 then is advanced to move the next cup 10 into the sealing station 26 and to move the sealed cup out of the sealing station and to a station where the lid 13 is applied to the cup. At the same time, the web is advanced one step to bring a fresh length of web beneath the mandrel. As the web is advanced, scrap web with circular holes therein is sucked upwardly past the upper roller 64 through an exhaust duct 100 and is delivered to a scrap bin (not shown).

From the foregoing, it will be apparent that the present invention brings to the art a new and improved machine 20 in which the mandrel 70 tamps the web 55 into the cup 10 so that the ultimate membrane 21 may accommodate the plug portion 15 of the lid 13. At the same time, the sealing shoe 72 seals the peripheral edge portions of the membrane effectively to the inner, top and outer sides of the upper lip 12 of the cup so as to seal in product freshness, flavor and color and to seal out bacteria, ultraviolet light and oxygen. The seal effected by the membrane prevents moisture loss, extends the shelf life of the product and prevents product loss otherwise resulting from loosening of the lid 13 during shipment. In addition, the membrane 21 provides a means for making the cup 10 tamper-evident.

The machine 20 is of relatively simple construction since the mandrel 70, the sealing shoe 72 and the knife are all incorporated in a single head 27. By loosening the set screws 49 and removing the rod 50 from the collar 48, the entire head may be removed from the machine and equipped with a mandrel, sealing shoe and knife of a different size or shape to enable the machine to handle cups of different types.

We claim:

1. A machine for applying and sealing heat-sealable film to the open upper ends of filled cups, said machine comprising, in combination, a conveyor for intermittently advancing said cups step-by-step along a predetermined path through a sealing station and for causing each cup to dwell momentarily in the sealing station, a rotatable supply roll containing an elongated web of said film, means for drawing said web off of said supply roll, for advancing said web step-by-step through said sealing station in upwardly spaced relation with the cups being advanced therethrough and for causing said web to dwell each time a cup dwells in the sealing station, and mechanism for forcing said web downwardly toward the upper end portion of each cup, for sealing a portion of said web to the upper end of such cup and for cutting said sealed portion from the remainder of said web, said mechanism comprising a head located in said sealing station, means for moving said head downwardly toward each cup dwelling in the sealing station and to an active position and for thereafter retracting the head upwardly from such cup before the cup is advanced out of the sealing station, said head comprising means overlying said web and operable to force a portion of web against the upper end portion of such cup during downward movement of said head, said head having a heated sealing element operable to seal the web to and around the upper end portion of said cup, and annular knife of circular cross-section carried by said head above said sealing element and operable to cut through said web outwardly of the outer periphery of the upper end portion of said cup after said web has been sealed to said cup, said head further comprising an annular platen underlying said web and adapted to telescope over a cup dwelling in said sealing station, said platen being located below said sealing element and said knife, and means on said platen and said conveyor and coacting with one another to rigidly fixture said head both longitudinally and laterally of said conveyor as said head is moved downwardly toward said active position and before said web is sealed to the cup dwelling in the sealing station.

2. A maching as defined in claim 1 further including means on said head and overlying said web for clamping said web against said platen and around said cup during cutting of said web by said knife.

3. A machine for applying and sealing heat-sealable film to the open upper ends of filled cups of circular cross-section and each having an upper lip around its open end, said machine comprising, in combination, a conveyor for intermittently advancing said cups step-by-step along a predetermined path through a sealing station and for causing each cup to dwell momentarily in the sealing station, a rotatable supply roll containing an elongated web of said film, means for drawing said web off of said supply roll, for advancing said web step-by-step through said sealing station in upwardly spaced relation with the cups being advanced therethrough and for causing said web to dwell each time a cup dwells in the sealing station, and mechanism for forcing a circular disc of said web downwardly into the upper end portion of each cup, for sealing the outer peripheral portion of said disc to the upper lip of such cup and for cutting said disc from the remainder of said web, said mechanism comprising a head located in said sealing station, means for moving said head downwardly toward each cup dwelling in the sealing station and to an active position and for thereafter retracting the head upwardly from such cup before the cup is advanced out of the sealing station, said head comprising a circular mandrel overlying said web and operable to telescope into the underlying dwelling cup and to tamp a circular disc-like portion of web into the upper end portion of such cup during downward movement of said head, said head also comprising a heated sealing element above said mandrel and operable to seal the web to and around the lip of said cup after said disc-like portion of web has been tamped into said cup, an annular knife of circular cross-section carried by said head above said sealing element and operable to cut through said web outwardly of the outer periphery of said lip after said web has been sealed to said lip, said head further comprising an annular platen underlying said web and adapted to telescope over a cup dwelling in said sealing station, said platen being located below said sealing element and said knife, and means on said platen and said conveyors and coacting with one another to rigidly fixture said head both longitudinally and laterally of said conveyor as said head is moved downwardly toward said active position and before said web is tamped into the cup dwelling in the sealing station.

4. A machine for applying and sealing heat-sealable film to the open upper ends of filled cups of circular cross-section and each having an upper lip around its open end, said machine comprising, in combination, a conveyor for intermittently advancing said cups step-by-step along a predetermined path through a sealing station and for causing each cup to dwell momentarily in the sealing station, a rotatable supply roll containing an elongated web of said film, means for drawing said web off of said supply roll, for advancing said web through said sealing station in upwardly spaced relation with the cups being advanced therethrough and for causing said web to dwell each time a cup dwells in the sealing station, and mechanism for forcing a circular disc of said web into the upper end portion of each cup, for sealing the outer peripheral portion of said disc to the upper lip of such cup and for cutting said disc from the remainder of said web, said mechanism comprising a head located in said sealing station, means for moving said head downwardly toward each cup dwelling in the sealing station and to an active position and for thereafter retracting the head upwardly from such cup before the cup is advanced out of the sealing station, said head comprising an annular platen underlying said web, means on said platen and said conveyor and coacting with one another to rigidly fixture said head both longitudinally and laterally of said conveyor as said head is moved downwardly toward said active position, said head further comprising a circular mandrel overlying said web and operable to telescope into the underlying dwelling cup and to tamp a circular disc-like portion of web into the upper end portion of such cup during continued downward movement of said head after fixturing of the head, said head also comprising a heated sealing element above said mandrel and operable to seal the web to and around the lip of said cup after said disc-like portion of web has been tamped into said cup, an annular knife of circular cross-section carried by said head above said sealing element and operable to cut through said web outwardly of the outer periphery of said lip after said web has been sealed to said lip, and means on said head and overlying said web for clamping said web against said platen and around said cup during cutting of said web by said knife.

* * * * *